(12) United States Patent
Nagashima et al.

(10) Patent No.: US 8,563,149 B2
(45) Date of Patent: *Oct. 22, 2013

(54) GLASS FOR DATA STORAGE MEDIUM SUBSTRATE, GLASS SUBSTRATE FOR DATA STORAGE MEDIUM AND MAGNETIC DISK

(75) Inventors: Tatsuo Nagashima, Chiyoda-ku (JP);
Kensuke Nagai, Chiyoda-ku (JP);
Tetsuya Nakashima, Chiyoda-ku (JP);
Kei Maeda, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 640 days.

This patent is subject to a terminal disclaimer.

(21) Appl. No.: 12/716,467

(22) Filed: Mar. 3, 2010

(65) Prior Publication Data

US 2011/0152058 A1    Jun. 23, 2011

Related U.S. Application Data

(63) Continuation of application No. 12/477,509, filed on Jun. 3, 2009, now Pat. No. 7,754,356, which is a continuation of application No. PCT/JP2008/073347, filed on Dec. 22, 2008.

(30) Foreign Application Priority Data

Jan. 28, 2008 (JP) .................................. 2008-016550

(51) Int. Cl.
*G11B 5/706*   (2006.01)
*C03C 3/23*    (2006.01)

(52) U.S. Cl.
USPC ........................... 428/846.9; 501/66; 360/135

(58) Field of Classification Search
USPC ........... 428/409, 410, 846, 846.9, 846.3, 848, 428/46.9; 501/5, 14, 15, 55, 56, 66, 70, 501/108, 64, 6; 65/29.21, 30.14, 14, 64, 66, 65/65; 360/135; 365/222
See application file for complete search history.

(56) References Cited

U.S. PATENT DOCUMENTS 5,997,977 A    12/1999 Zou et al.
6,162,751 A    12/2000 Speit et al.
(Continued)

FOREIGN PATENT DOCUMENTS

JP    2000-119042    4/2000
JP    2000-357318    12/2000
(Continued)

OTHER PUBLICATIONS

Machine translation—Koike et al JP 2001-134925 (May 2001).*

(Continued)

*Primary Examiner* — Kevin M. Bernatz
*Assistant Examiner* — Louis Falasco
(74) *Attorney, Agent, or Firm* — Oblon, Spivak, McClelland, Maier & Neustadt, L.L.P.

(57) ABSTRACT

To provide glass for a data storage medium substrate, whereby high heat resistance can be obtained.
Glass for a data storage medium substrate, which comprises, as represented by mol percentage based on the following oxides, from 55 to 70% of $SiO_2$, from 2.5 to 9% of $Al_2O_3$, from 0 to 10% of MgO, from 0 to 7% of CaO, from 0.5 to 10% of SrO, from 0 to 12.5% of BaO, from 0 to 2.5% of $TiO_2$, from 0.5 to 3.7% of $ZrO_2$, from 0 to 2.5% of $Li_2O$, from 0 to 8% of $Na_2O$, from 2 to 8% of $K_2O$ and from 0.5 to 5% of $La_2O_3$, provided that the total content of $Al_2O_3$ and $ZrO_2$ ($Al_2O_3$+$ZrO_2$) is at most 12%, and the total content of $Li_2O$, $Na_2O$ and $K_2O$ ($R_2O$) is at most 12%.

13 Claims, 2 Drawing Sheets

(56) References Cited

U.S. PATENT DOCUMENTS

| | | |
|---|---|---|
| 6,297,182 B1 | 10/2001 | Maeda et al. |
| 6,303,528 B1 | 10/2001 | Speit et al. |
| 6,313,052 B1 | 11/2001 | Nakashima et al. |
| 6,387,510 B1 | 5/2002 | Nakashima et al. |
| 6,395,368 B1 | 5/2002 | Yamaguchi et al. |
| 6,458,729 B1 | 10/2002 | Nagata et al. |
| 6,555,232 B1 | 4/2003 | Aitken et al. |
| 6,908,870 B2 | 6/2005 | Kawai |
| 6,942,934 B2 | 9/2005 | Kawai |
| 6,949,485 B2 | 9/2005 | Nakashima et al. |
| 7,192,898 B2 | 3/2007 | Mori et al. |
| 7,273,668 B2 | 9/2007 | Kurachi et al. |
| 7,396,788 B2 | 7/2008 | Kawai et al. |
| 7,754,356 B2* | 7/2010 | Nagashima et al. ....... 428/846.9 |
| 2005/0117438 A1 | 6/2005 | Ikenishi et al. |
| 2005/0162956 A1* | 7/2005 | Ikenishi et al. ............... 365/222 |
| 2005/0215414 A1 | 9/2005 | Kawai |
| 2006/0040142 A1 | 2/2006 | Zou et al. |
| 2006/0205584 A1* | 9/2006 | Ikenishi et al. ................. 501/66 |
| 2009/0110963 A1 | 4/2009 | Nakashima et al. |
| 2009/0239035 A1 | 9/2009 | Nagai et al. |

FOREIGN PATENT DOCUMENTS

| | | | | |
|---|---|---|---|---|
| JP | 2001-134925 | * | 5/2001 | ............... G11B 5/73 |
| JP | 2001-180969 | | 7/2001 | |
| JP | 2001-348246 | | 12/2001 | |
| JP | 2002-201040 | | 7/2002 | |
| WO | WO 2008/062847 A1 | | 5/2008 | |

OTHER PUBLICATIONS

Koike et al., (JP 2001-134925) May 18, 2001—translation.
U.S. Appl. No. 12/769,703, filed Apr. 29, 2010, Nagai, et al.

* cited by examiner

8,563,149 B2

GLASS FOR DATA STORAGE MEDIUM SUBSTRATE, GLASS SUBSTRATE FOR DATA STORAGE MEDIUM AND MAGNETIC DISK

TECHNICAL FIELD

The present invention relates to a glass substrate to be used for a data storage medium such as a magnetic disk or an optical disk, glass therefor and a magnetic disk.

BACKGROUND ART

As glass for a data storage medium substrate such as a magnetic disk or an optical disk, for example, lithium-containing aluminosilicate glass having a high Young's modulus or one having chemical reinforcing treatment applied thereto (e.g. Patent Document 1), or crystallized glass having a crystal layer precipitated by heat-treating glass having a specific composition (e.g. Patent Document 2), is used.

In recent years, along with an increase of the storage capacity of a hard disk drive, development for high recording density has been in progress at a high pace. However, along with the development for high recording density, microsizing of magnetic particles tends to impair the thermal stability, and crosstalk or a decrease in the SN ratio of playback signals is problematic. Here, a heat-assisted magnetic recording technology has attracted attention as a united technique of light and magnetism. This is a technique wherein a magnetic recording layer is irradiated with a laser beam or near-field light to have the coercive force locally reduced at the heated portion, and in such a state, an external magnetic field is applied for recording, and the recorded magnetization is read out by e.g. a GMR element. Thus, recording can be made on a high-coercive force medium, whereby it becomes possible to microsize the magnetic particles while maintaining the thermal stability. However, in order to form such a high-coercive force medium in the form of a multilayer film, the substrate is required to be sufficiently heated, and a highly heat resistant substrate is required.

Patent Document 1: JP-A-2001-180969
Patent Document 2: JP-A-2000-119042

DISCLOSURE OF THE INVENTION

Problems to be Solved by the Invention

Substrate glass for chemical reinforcing treatment has heat resistance adjusted to be low so that chemical reinforcing treatment can efficiently be applied, and is likely to be buckled by heating at the time of forming the above-mentioned high-coercive force medium in the form of a multilayer film. Further, when a chemically reinforced glass substrate is subjected to the above-mentioned heating, the ion exchange-treated layer is likely to be diffused by such heating, whereby the strength is likely to be deteriorated.

Further, if it is attempted to employ a crystallized glass substrate, the substrate surface is likely to be distorted by the above-mentioned heating due to a difference in the thermal expansion coefficient between the crystalline layer and the bulk body.

It is an object of the present invention to provide glass for a data storage medium substrate, whereby high heat resistance can be obtained even if no chemical reinforcing treatment or crystallizing treatment is applied, a glass substrate for a data storage medium, and a magnetic disk.

Means to Solve the Problems

The present invention provides glass for a data storage medium substrate (hereinafter referred to as the glass of the present invention), which comprises, as represented by mol percentage based on the following oxides, from 55 to 70% of $SiO_2$, from 2.5 to 9% of $Al_2O_3$, from 0 to 10% of MgO, from 0 to 7% of CaO, from 0.5 to 10% of SrO, from 0 to 12.5% of BaO, from 0 to 2.5% of $TiO_2$, from 0.5 to 3.7% of $ZrO_2$, from 0 to 2.5% of $Li_2O$, from 0 to 8% of $Na_2O$, from 2 to 8% of $K_2O$ and from 0.5 to 5% of $La_2O_3$, provided that the total content of $Al_2O_3$ and $ZrO_2$ ($Al_2O_3+ZrO_2$) is at most 12%, and the total content of $Li_2O$, $Na_2O$ and $K_2O$ ($R_2O$) is at most 12%.

Further, the present invention provides glass for a data storage medium substrate (hereinafter referred to as the first glass or the glass 1), which comprises, as represented by mol percentage based on the following oxides, from 55 to 70% of $SiO_2$, from 2.5 to 9% of $Al_2O_3$, from 0 to 10% of MgO, from 0 to 7% of CaO, from 1 to 10% of SrO, from 0.5 to 12.5% of BaO, from 0 to 2.5% of $TiO_2$, from 0.5 to 3.7% of $ZrO_2$, from 0 to 2.5% of $Li_2O$, from 0 to 5% of $Na_2O$, from 2 to 8% of $K_2O$ and from 0.5 to 5% of $La_2O_3$, provided that $Al_2O_3+ZrO_2$ is at most 12%, the difference obtained by subtracting the $Li_2O$ content from the total content of SrO and BaO is at least 2%, and $R_2O$ is at most 10%.

Further, the present invention provides glass for a data storage medium substrate (hereinafter referred to as the second glass or the glass 2), which comprises, as represented by mol percentage based on the following oxides, from 60 to 70% of $SiO_2$, from 2.5 to 9% of $Al_2O_3$, from 2 to 10% of MgO, from 0 to 7% of CaO, from 0.5 to 10% of SrO, from 0 to 5% of BaO, from 0 to 1% of $TiO_2$, from 1 to 3.7% of $ZrO_2$, from 0 to 2.5% of $Li_2O$, from 2 to 8% of $Na_2O$, from 2 to 8% of $K_2O$ and from 0.5 to 3% of $La_2O_3$, provided that $Al_2O_3+ZrO_2$ is at most 12%, the total content of MgO, CaO, SrO and BaO (RO) is at least 10 mol %, and $R_2O$ is at most 12%.

Further, the present invention provides a glass substrate for a data storage medium, which is made of the above glass for a data storage medium substrate.

Further, the present invention provides a magnetic disk having a magnetic recording layer formed on the above glass substrate for a data storage medium.

Effects of the Invention

According to the present invention, it becomes possible to obtain a highly heat resistant glass substrate for a data storage medium suitable for a heat-assisted magnetic recording even without applying chemical reinforcing treatment or crystallization treatment.

According to a preferred embodiment of the present invention, it is possible to obtain glass having a small content of an alkali metal oxide, whereby an improvement of the weather resistance of a glass substrate can be expected.

Further, it becomes possible to obtain a glass substrate having a thermal expansion coefficient comparable with a conventional glass substrate.

Further, it becomes possible to use a float process, which is useful for mass production of a glass substrate.

Further, it becomes possible to obtain glass having a Young's modules (E) of at least 75 GPa, whereby the glass substrate tends to be scarcely deflected, and it becomes possible to increase the storage capacity. Even when the storage medium is subjected to a shock, it tends to be hardly breakable.

Further, when E is adjusted to be at most 90 GPa, the polishing processing of the glass substrate tends to be easy.

Further, it becomes possible to minimize the surface roughness of glass after the final polishing.

BEST MODE FOR CARRYING OUT THE INVENTION

Figure 1:
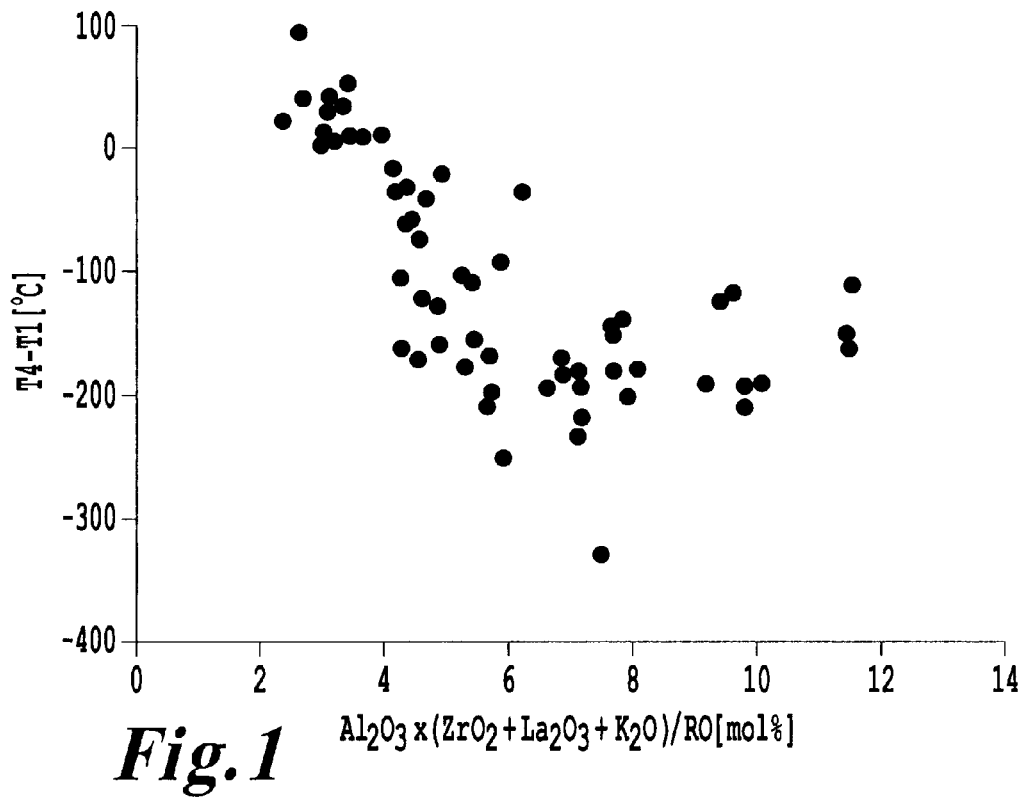
FIG. 1 is a graph showing the relation between a value obtained by dividing a product of the $Al_2O_3$ content multiplied by the total content of $ZrO_2$, $K_2O$ and $La_2O_3$, by the total content of MgO, CaO, SrO and BaO (Al(ZrKLa)/RO), and the difference $\Delta T$ obtained by subtracting the liquid is phase temperature from the temperature where the viscosity becomes $10^4$ dPa·s.

The glass substrate for a data storage medium in the present invention is typically a circular glass plate having a thickness of from 0.5 to 1.5 mm and a diameter of from 48 to 93 mm, and in the case of a magnetic disk glass substrate or the like, a hole having a diameter of from 15 to 25 mm is usually formed at its center.

In a magnetic disk of the present invention, at least a magnetic layer being a magnetic recording layer is formed on the main surface of the glass substrate for a data storage medium of the present invention, and in addition, an underlayer, a protective layer, a lubricating layer or a roughness-controlling layer may, for example, be formed as the case requires.

A process for producing the glass substrate for a data storage medium of the present invention is not particularly limited. For example, materials for the respective components commonly used may be blended to have a desired composition, such a mixture is heated and melted in a glass melting furnace, the molten glass is homogenized by e.g. bubbling, stirring or addition of a clarifier, followed by forming into a plate glass having a predetermined thickness made of the glass for a data storage medium substrate of the present invention, by a well known method such as a float process, a press method or a Down-draw method. Then, after annealing, processing such as grinding or polishing may be carried out to obtain a glass substrate having prescribed size and shape. As the forming method, a float process suitable for mass production is preferred.

The glass transition temperature (Tg) of the glass of the present invention is preferably at least 660° C. If it is lower than 660° C., it tends to be difficult to apply the above-mentioned heat-assisted magnetic recording technique to be carried out at a high heat treating temperature to form a magnetic layer. It is more preferably at least 680° C., particularly preferably at least 690° C., and especially when it is desired to increase the heat resistance, it is preferably at least 700° C. Tg is typically at most 740° C.

The glass of the present invention preferably has an average linear expansion coefficient ($\alpha$) of at least $75\times10^{-7}$/° C. within a range of from 50 to 350° C. If $\alpha$ is less than $75\times10^{-7}$/° C., it is smaller than $\alpha$ of conventional glass, and on the other hand, $\alpha$ of the metal of the hub to be attached to the substrate is typically at least $100\times10^{-7}$/° C., whereby the difference in $\alpha$ between the hub and the glass substrate becomes large, and the glass substrate is likely to be easily broken. $\alpha$ is more preferably at least $76\times10^{-7}$/° C., particularly preferably at least $77\times10^{-7}$/° C., most preferably at least $78\times10^{-7}$/° C., and typically at most $90\times10^{-7}$/° C.

With the glass of the present invention, the difference between the temperature ($T_4$) at which the viscosity becomes $10_4$ dPa·s and the liquid phase temperature ($T_L$) i.e. $\Delta T(=T_4-T_L)$ is preferably at least −70° C. If the difference is less than −70° C., forming into a glass plate tends to be difficult.

$\Delta T$ is more preferably at least 0° C. If $\Delta T$ is less than 0° C., forming by a float process tends to be difficult. $\Delta T$ is particularly preferably at least 10° C., most preferably at least 20° C.

The density (d) of the glass of the present invention is preferably at most 3.3 g/cm³. If d exceeds 3.3 g/cm³, weight reduction of the data storage medium tends to be difficult, the power consumption required for driving the recording medium tends to increase, the disk tends to be vibrated by an influence of a windage loss during its rotation thus leading to an error in reading out, or when a recording medium receives a shock, the substrate tends to be easily deflected and is likely to be broken by formation of a stress. Thus, d is more preferably at most 3.0 g/cm³, most preferably at most 2.8 g/cm³. Of the glass 2, d is typically at most 2.75 g/cm³.

The Young's modulus (E) of the glass of the present invention is preferably from 75 to 90 GPa. If E is less than 75 GPa, the disk tends to be vibrated by an influence of a windage loss during its rotation thus leading to an error in reading out, or when a recording medium receives a shock, the substrate tends to be easily deflected and is likely to be broken by formation of a stress. E is more preferably at least 78 GPa, most preferably at least 80 GPa. If E exceeds 90 GPa, the polishing rate tends to be low, or a local stress is likely to be formed whereby breakage is likely to result, and it is typically at most 87 GPa.

E/d is typically from 25 to 35 MN/kg, and in the case of the glass 2, it is typically from 28 to 33 MN/kg.

The above-mentioned first glass is glass of the present invention and is one wherein SrO is at least 1 mol %, BaO is at least 0.5 mol %, $Na_2O$ is from 0 to 5 mol %, the difference obtained by subtracting the $Li_2O$ content from the total content of SrO and BaO is at least 2 mol %, and $R_2O$ is at most 10 mol %.

This first glass is suitable in a case where e.g. $T_4$ is desired to be lowered, $\Delta T$ is desired to be increased, or Tg is desired to be made high.

The above-mentioned second glass is glass of the present invention and is one wherein $SiO_2$ is at least 60 mol %, MgO is at least 2 mol %, BaO is from 0 to 5 mol %, $TiO_2$ is from 0 to 1 mol %, $ZrO_2$ is from 1 to 3.7 mol %, $Na_2O$ is at least 2 mol %, $La_2O_3$ is at most 3%, and RO is at least 10 mol %.

This second glass is suitable in a case where e.g. d or E/d is desired to be made small, or phase separation is desired to be made to hardly occur.

Now, the composition of the glass of the present invention will be described. Here, the contents of the respective components are represented by mol percentage unless otherwise specified.

$SiO_2$ is an essential component to form the skeleton of the glass. If $SiO_2$ is less than 55%, the glass tends to be unstable, or the weather resistance or acid resistance tends to deteriorate. $SiO_2$ is preferably at least 57%, typically at least 60%. If $SiO_2$ exceeds 70%, $\alpha$ tends to be too small, or the melting temperature to prepare the glass tends to be too high. $SiO_2$ is preferably at most 68%, typically at most 67%.

In the glass 2, $SiO_2$ is at least 60%. If $SiO_2$ is less than 60%, the glass tends to be unstable, the glass tends to undergo phase separation, or Tg, weather resistance or acid resistance tends to deteriorate. $SiO_2$ is preferably at least 61%, typically at least 63%.

In the glass 2, the content of $SiO_2$ as represented by mass percentage is typically less than 60.2%.

$Al_2O_3$ has an effect to increase Tg, weather resistance or E and is an essential component. If $Al_2O_3$ is less than 2.5%, the above effect tends to be small, and it is preferably at least 4%. If $Al_2O_3$ exceeds 9%, $ZrO_2$ type or K—Al—Si type crystals are likely to precipitate, and $T_L$ is likely to be high, and it is preferably at most 8%. Further, in the glass 1, the $Al_2O_3$ content represented by mass percentage is typically less than 11%, more typically at most 10.5%.

MgO is not an essential component, but has an effect to lower the viscosity of the molten glass thereby to facilitate melting of the glass, to reduce d or to increase E, and thus it may be contained in an amount of up to 10%. If MgO exceeds 10%, the chemical durability tends to deteriorate, the glass tends to be unstable, or $T_L$ tends to be too high, and further, the glass is likely to undergo phase separation. And accordingly, it is preferably at most 9%. In a case where MgO is contained, it is preferably contained in an amount of at least 1%. In the glass 2, MgO is particularly preferably at most 9%.

In the glass 2, MgO is an essential component. If MgO is less than 2%, the viscosity of the molten glass tends to be so high that the glass tends to be hardly melted, d tends to be large, or E tends to be low. MgO is preferably at least 4%.

CaO is not an essential component, but has an effect to lower the viscosity of the molten glass to facilitate melting of the glass, or to increase E, and it may be contained up to 7%. If CaO exceeds 7%, it tends to form crystals with Si or La, $T_L$ is likely to be high, the glass tends to be unstable, or the chemical durability tends to deteriorate, and further, the glass is likely to undergo phase separation. CaO is preferably at most 6%, and in the glass 2, it is typically at most 4%. In a case where CaO is contained, the content is typically at least 1%.

SrO has an effect to increase α, to lower the viscosity of the molten glass thereby to facilitate melting of the glass, or to lower $T_L$ and is essential. If SrO is less than 0.5%, the above effect tends to be small, and it is preferably at least 1%, more preferably at least 2%. If SrO exceeds 10%, the chemical durability tends to be low, the glass tends to be unstable, or d tends to be too large, and it is preferably at most 8%.

In the glass 1, if SrO is less than 1%, the above effect tends to be low, and SrO is at least 1%, preferably at least 2%.

BaO is not an essential component, but has an effect to increase α, to lower the viscosity of the molten glass thereby to facilitate melting of the glass, or to lower $T_L$, and it may be contained in an amount of up to 12.5%. If BaO exceeds 12.5%, Ba—Al—Si type crystals are likely to be formed, whereby $T_L$ is rather likely to be high, the weather resistance tends to deteriorate, d tends to be too large, or E tends to deteriorate, and it is preferably at most 10%. In a case where BaO is contained, the content is typically at least 0.1%.

In the glass 1, BaO is essential. If BaO is less than 0.5%, the viscosity of the molten glass tends to be high, whereby the glass tends to be hardly melted, or $T_L$ tends to be high, and it is preferably at least 1%.

In the glass 2, if BaO is contained, the content is at most 5%. If BaO exceeds 5%, d is likely to be too large, or E tends to deteriorate, and it is preferably at most 3%.

The total content RO of MgO, CaO, SrO and BaO is preferably at least 10%. If RO is less than 10%, α is likely to be too small, and it is typically at least 12%.

On the other hand, RO is preferably at most 30%. If RO exceeds 30%, Tg is likely to be low, or d is likely to be large, and it is preferably at most 25%, typically at most 22%.

In the glass 2, RO is required to be at least 10%. If RO is less than 10%, α is likely to be too small, and it is typically at least 12%.

$TiO_2$ is not an essential component, but has an effect to increase Tg, weather resistance or E, and thus, it may be contained in an amount of up to 2.5%. If $TiO_2$ exceeds 2.5%, the glass is likely to be unstable, and it is preferably at most 2%. In a case where $TiO_2$ is contained, the content is typically at least 0.5%.

In the glass 1, the total content of MgO, CaO and $TiO_2$ is preferably at most 16%. If the total content exceeds 16%, phase separation is likely to take place in a case where the annealing temperature is high at the time of annealing the glass or in a case where the cooing rate is slow.

In the glass 2, in a case where $TiO_2$ is contained, the content is at most 1%. If $TiO_2$ exceeds 1%, the glass is likely to undergo phase separation, and it is preferably at most 0.9%, more preferably at most 0.5%. In order to suppress phase separation, it is preferred not to contain $TiO_2$.

$ZrO_2$ has an effect to increase Tg, the weather resistance or E and thus is essential. If it is less than 0.5%, the above effect tends to be small, and it is preferably at least 1%. If $ZrO_2$ exceeds 3.7%, $ZrO_2$ crystals are likely to precipitate, $T_L$ is likely to be high, or d is likely to be too large, and it is preferably at most 3.6%.

If the total content of $Al_2O_3$ and $ZrO_2$ ($Al_2O_3+ZrO_2$) exceeds 12%, $T_L$ is likely to be too high, and the total content is typically at most 11%.

In the glass 2, $ZrO_2$ is at least 1%. If $ZrO_2$ is less than 1%, the weather resistance is likely to deteriorate, E tends to be small, or phase separation is likely to take place.

In the glass 2, the ratio of the content of $SiO_2$ represented by mass percentage to the sum of the $TiO_2$ and $ZrO_2$ contents represented by mass percentage ($SiO_2/(TiO_2+ZrO_2)$) is preferably more than 10. If the ratio is 10 or less, $T_L$ is likely to be high, and the ratio is preferably at least 12.

$Li_2O$ is not an essential component, but has an effect to increase α, to lower the viscosity of the molten glass thereby to facilitate melting of the glass, or to increase E, and may be contained in an amount of up to 2.5%. If $Li_2O$ exceeds 2.5%, Tg is likely to substantially decrease, or the weather resistance is likely to deteriorate, and in the glass 2, phase separation is likely to take place in addition, and it is preferably at most 1%, and typically preferably no $Li_2O$ is contained.

In the glass 1, the difference obtained by deducting the $Li_2O$ content from the total content of SrO and BaO [(SrO+BaO)—$Li_2O$] is at least 2%. If this difference is less than 2%, Tg is likely to be too low, and the difference is preferably at least 3.5%.

$Na_2O$ is not an essential component, but has an effect to increase α, or to lower the viscosity of the molten glass thereby to facilitate melting of the glass, and thus may be contained in an amount of up to 8%. If $Na_2O$ exceeds 8%, Tg of the weather resistance is likely to deteriorate, and it is preferably at most 6%.

In the glass 1, when $Na_2O$ is contained, the content is at most 5%. If $Na_2O$ exceeds 5%, Tg or the weather resistance is likely to deteriorate, and it is preferably at most 4%. In the glass 2, $Na_2O$ is an essential component. If $Na_2O$ is less than 2%, α tends to be small, or the viscosity of the molten glass is likely to be large whereby the glass tends to be hardly melted, and it is preferably at least 3%.

$K_2O$ has an effect to increase α or to lower the viscosity of the molten glass thereby to facilitate melting of the glass and is essential. If $K_2O$ is less than 2%, such an effect tends to be small, and it is preferably at least 3%. If $K_2O$ exceeds 8%, K—Si—Al type crystals are likely to be formed, whereby $T_L$ is likely to be high, or the weather resistance or E is likely to be low, and it is preferably at most 7%.

If the total content of $Li_2O$, $Na_2O$ and $K_2O$ i.e. $R_2O$ exceeds 12%, Tg or the weather resistance is likely to deteriorate, and it is preferably at most 10%.

$R_2O$ is preferably at least 5%. If it is less than 5%, α tends to be too small, or the viscosity of the glass is likely to be high.

In the glass 1, $R_2O$ is at most 10%. If $R_2O$ exceeds 10%, Tg or the weather resistance is likely to deteriorate, and it is preferably at most 9%.

The molar ratio of the total content of $Li_2O$ and $Na_2O$ to the $K_2O$ content i.e. $(Li_2O+Na_2O)/K_2O$ is preferably at most 3. If the molar ratio exceeds 3.0, Tg is likely to be too low, or the effect to lower Tg tends to be not negligible rather than the effect to increase α, and it is preferably at most 1.4, typically at most 1.1. In the glass 1, such a molar ratio is preferably at most 1.4.

$La_2O_3$ has an effect to increase Tg, to increase a or to increase E and thus is essential. If $La_2O_3$ is less than 0.5%, such an effect tends to be small, and it is preferably at least 1%. If $La_2O_3$ exceeds 5%, Si—La type crystals or Si—Ca—La type crystals are likely to be formed, whereby $T_L$ is likely to be high, or d is likely to be too large, and it is preferably at most 3%.

In the glass 2, $La_2O_3$ is at most 3%. If $La_2O_3$ exceeds 3%, Si—La type crystals or Si—Ca—La type crystal are likely to be formed, whereby $T_L$ is rather likely to be high, d is likely to be large, or phase separation is likely to take place, and it is preferably at most 2%.

In connection with the glass 1, FIG. 1 is a graph wherein a value obtained by dividing a product of the $Al_2O_3$ content multiplied by the total content of $ZrO_2$, $K_2O$ and $La_2O_3$, by the total content of MgO, CaO, SrO and BaO i.e. Al(ZrKLa)/RO (abscissa, unit: mol %), and $\Delta T=T_4-T_L$ (ordinate, unit: °C.) were plotted with respect to 67 types of glass with compositions comprising, as represented by mol percentage, from 52 to 67.5% of $SiO_2$, from 4 to 15% of $Al_2O_3$, from 0 to 8.5% of MgO, from 0 to 8% of CaO, from 0.5 to 9% of SrO, from 0 to 10% of BaO, from 0 to 4% of $TiO_2$, from 0 to 4% of $ZrO_2$, from 0 to 2.5% of $Li_2O$, from 0 to 6% of $Na_2O$, from 3 to 7% of $K_2O$ and from 0 to 5% of $La_2O_3$. Here, with respect to $T_4$ of some of glass, values calculated from their compositions were employed.

From FIG. 1, it is evident that Al(ZrKLa)/RO should preferably be made to be at most 4.0% when it is desired to adjust $\Delta T$ to be at least 0° C. If Al(ZrKLa)/RO exceeds 4.0%, $\Delta T$ is likely to be less than 0° C., whereby forming by a float process is likely to be difficult. It is more preferably at most 3.5%, particularly preferably at most 3.0%.

In the glass 1, in a case where the total content of $Al_2O_3$ and $ZrO_2$ is at most 9%, the total content of $Al_2O_3$, $ZrO_2$, $K_2O$ and $La_2O_3$ is preferably at most RO. Otherwise, Si—Al—La type crystals, $ZrO_2$ type crystals or Si—K—La type crystals are likely to precipitate, whereby $\Delta T$ is likely to be small.

In the glass 1, in a case where the total content of $Al_2O_3$ and $ZrO_2$ exceeds 9%, the total content of $ZrO_2$ and $K_2O$ is preferably less than 9%. Otherwise, $ZrO_2$ type crystals or Si—K—La type crystals are likely to precipitate, whereby $\Delta T$ is likely to be small.

Figure 2:
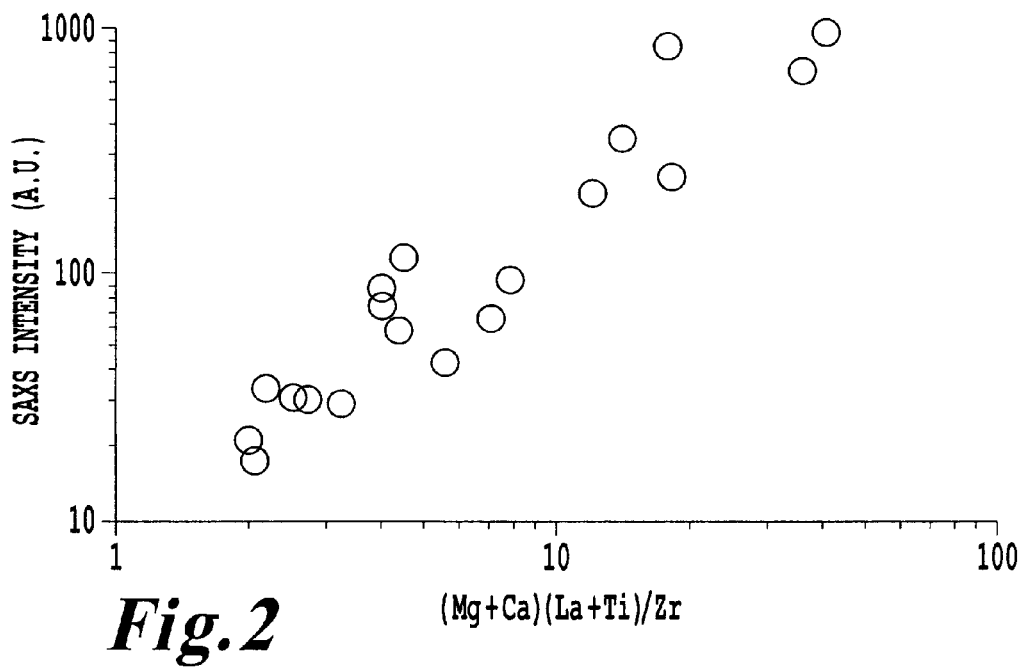
FIG. 2 is a graph showing the relation between a value obtained by dividing a product of the sum of the MgO and CaO contents multiplied by the sum of the $La_2O_3$ and $TiO_2$ contents, by the $ZrO_2$ content $((((MgO+CaO)\times(La_2O_3+TiO_2))\div ZrO_2)$, unit: mol %), and the scattered peak intensity (optional unit) obtained by carrying out the measurement of small-angle X-ray scattering of the glass.

In connection with the glass 2, FIG. 2 is a graph wherein a value obtained by dividing a product of the sum of the MgO and CaO contents multiplied by the sum of the $La_2O_3$ and $TiO_2$ contents, by the $ZrO_2$ content i.e. (Mg+Ca)(La+Ti)/Zr (abscissa, unit: mol %), and the scattered peak intensity obtained by carrying out the measurement of small-angle X-ray scattering of the glass i.e. SAXS intensity (ordinate, optional unit) were plotted with respect to 20 types of glass with compositions comprising, as represented by mol percentage, from 64.3 to 67.3% of $SiO_2$, from 7.2 to 8.0% of $Al_2O_3$, from 4.5 to 8.5% of MgO, from 0 to 8% of CaO, from 0.5 to 6.0% of SrO, from 0 to 2.0% of BaO, from 0 to 2.0% of $TiO_2$, from 1.0 to 3.0% of $ZrO_2$, from 3.0 to 6.5% of $Na_2O$, from 2.5 to 6.3% of $K_2O$, and from 0.5 to 1.3% of $La_2O_3$.

Figure 3:
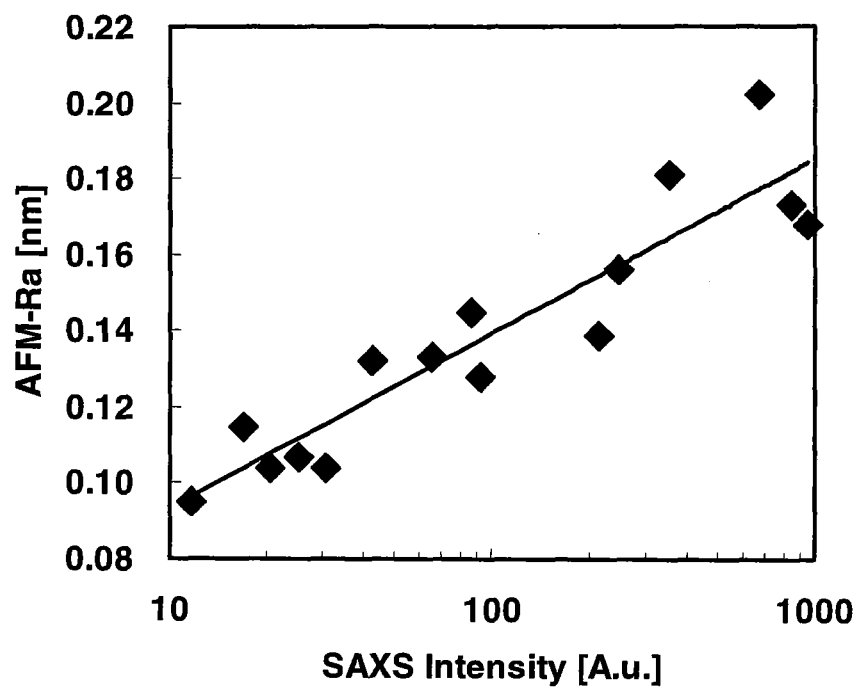
FIG. 3 is a graph showing the relation between the scattered peak intensity (optional unit) obtained by carrying out the measurement of small-angle X-ray scattering of the glass, and the surface roughness Ra (unit: nm) of the polished glass, as measured by an atomic force microscope.

Here, the measurement of small-angle X-ray scattering of the glass was carried out as follows for the purpose of evaluating fine phase separation in the glass. Namely, using NANO-Viewer manufactured by Rigaku K.K. as a small-angle X-ray scattering apparatus, and a imaging plate as a detector, X-ray was passed through a glass sample having a thickness of about 0.1 mm and a size of about 1 cm×1 cm, and the obtained two-dimensional data was estimated by the average characteristics of radiation emitted by a circular ring and then data-conversion to obtain one-dimensional data, which was then subjected to transmittance correction, in-air scattering correction and sample-thickness correction to obtain a scattered peak intensity. This scattered peak intensity has a correlation with the surface roughness AFM-Ra of the glass at the time of the final polishing as described hereinafter, as shown in FIG. 3.

In a case where a surface recording density of at least 1 Tb/inch$^2$ is desired to be realized, such AFM-Ra is required to be adjusted to a level of at most 0.15 nm, more preferably at most 0.12 nm. For such a purpose, for example from FIG. 3, it is evident that when AFM-Ra is desired to be adjusted to a level of at most 0.15 nm, the above scattered peak intensity is preferably adjusted to a level of at most 220 (optional unit) or when AFM-Ra is desired to be adjusted to a level of at most 0.12 nm, the above scattered peak intensity is preferably adjusted to a level of at most 50 (optional unit). Accordingly, in such a case, it is evident from FIG. 2 that (Mg+Ca)(La+Ti)/Zr is preferably adjusted to be level of at most 12.0%. If (Mg+Ca)(La+Ti)/Zr exceeds 12.0%, the compositional fluctuation due to phase separation tends to be large, and the surface roughness at the time of the final polishing is likely to deteriorate, and it is more preferably at most 10.0%, particularly preferably at most 8.0%.

The glass of the present invention consists essentially of the above-mentioned components, but may contain other components within a range not to impair the purpose of the present invention. In a case where such other components are contained, the total content of such other components is preferably at most 5%, more preferably at most 2%. Now, such other components will be exemplified.

A clarifier such as $SO_3$, Cl, $As_2O_3$ or $Sb_2O_3$ may be contained in a total amount of up to 1%.

Further, in a case where heating by irradiation with infrared ray is carried out for heating a substrate, in order to increase the emissivity in the irradiation wavelength zone, a colorant such as $Fe_2O_3$, NiO, CoO, $Cr_2O_3$, CuO, $MnO_2$, $CeO_2$, $Er_2O_3$ or $Yb_2O_3$ may be contained in a total amount of up to 0.5%.

ZnO may have an effect to lower the viscosity of the molten glass thereby to facilitate melting of the glass, or to lower $T_L$, and in such a case, it may be contained in an amount of up to 5%. If ZnO exceeds 5%, Tg is likely to be low, or d is likely to be large, and it is preferably at most 3%.

$B_2O_3$ may sometimes be contained in an amount of up to 5% in order to e.g. lower $T_L$, but it may decrease the uniformity or phase separation characteristics of the glass, and in such a case, it is preferably not contained.

EXAMPLES

In each of Examples 1 to 21, 28 to 50 and 52 to 65 in Tables 1 to 8, materials were prepared and mixed to obtain a composition shown by mol percentage in sections for from $SiO_2$ to $La_2O_3$ and by means of a platinum crucible, melted at a temperature of from 1,550 to 1,650° C. for from 3 to 5 hours. Typically, the mixture was melted at a temperature of from 1,550 to 1,650° C. for from 1 to 2 hours, then stirred for 1 hour and further clarified for 1 hour. Then, the molten glass was cast to form a plate, followed by annealing.

With respect to a glass plate thus obtained, Tg (unit: ° C.), α (unit: $10^{-7}$/° C.), the density d (unit: g/cm$^3$), the Young's modulus E (unit: GPa), the specific modulus E/d (unit: MNm/kg), the temperature $T_4$ at which the viscosity becomes $10^4$ P=$10^4$ dPa·s (unit: ° C.), the liquid phase temperature $T_L$ (unit: ° C.), the phase separation property, and the above-mentioned scattered peak intensity (optional unit) were measured or evaluated by the following methods. The results are shown in Tables. In the Tables, "–" means that no measurement was carried out, and "*" means that the value was one obtained by calculation from the composition.

Tg: By means of a differential thermal dilatometer and using quartz glass as a reference sample, the rate of elongation of glass when it was heated from room temperature at a rate of 5° C./min to a temperature at which the glass softened and elongation no longer observed i.e. a yield point, whereby a temperature corresponding to the critical point in the thermal expansion curve was taken as the glass transition temperature.

α: From the thermal expansion curve obtained in the same manner as the above measurement of Tg, an average linear expansion coefficient within a range of from 50 to 350° C. was calculated.

d: Measured by an Archimedes method.

E: With respect to a glass plate having a thickness of from 4 to 10 mm and a size of about 4 cm×4 cm, the measurement was made by an ultrasonic pulse method.

$T_4$: Measured by means of a rotation viscometer.

$T_L$: A glass specimen of about 1 cm×1 cm×0.8 cm was placed on a platinum plate and heat-treated for 3 hours in an electric furnace set at every 10° C. within a temperature range of from 1,100 to 1,300° C. The glass was left to cool in atmospheric air and then observed by a microscope, whereby the temperature range where crystals were precipitated was taken as a liquid phase temperature.

Phase separation property: A glass specimen of about 1 cm×1 cm×0.8 cm was placed on a platinum plate and put in an electric furnace set at 850° C. and 750° C. and maintained for about 20 minutes, whereupon it was annealed at a cooling rate of –1° C./min or –10° C./min to room temperature, followed by irradiation with a high luminance power source, whereby whether or not turbidity was observed, was visually confirmed. As a result, one where no turbidity was observed in all tests was identified by ⊚, one where no turbidity was observed under the conditions of 750° C. and –1° C./min was identified by ○, one where no turbidity was observed under the conditions of 750° C. and –10° C./min was identified by Δ, and one where turbidity was observed in all tests was identified by ×. The results are shown in the section for "Phase separation property 1" in the Tables.

Scattered peak intensity: As mentioned above, the measurement of small-angle X-ray scattering of glass was carried out, and data treatments were carried out to obtain the scattered peak intensity. The results are shown in the section for "Phase separation property 2" in the Tables. As mentioned above, in a case where the after-mentioned AFM-Ra is desired to be adjusted to be at most 0.15 nm, this scattered peak intensity is preferably at most 220.

In Examples 22 to 27 and 51, no glass was prepared, and Tg, etc. were obtained by calculation from the compositions.

Examples 1 to 52 represent Examples of the present invention, and among them, Examples 1 to 27 and 31 to 36 are examples for the glass 1, and Examples 9, 11, 16 and 28 to 48 are examples for the glass 2. Example 53 is a Reference Example, and Examples 54 to 65 are Comparative Examples.

Tables 9 to 16 show the compositions of the glasses in Examples 1 to 65 as represented by mass percentage.

The following test was carried out to measure the surface roughness after the polishing of each glass in Examples 6, 16, 28 to 31, 34, 37 to 39, 41, 43, 44, 52 and 63 to 65.

As a test specimen, one obtained by finishing a glass plate having a thickness of about 1.5 mm and a size of about 4 cm×4 cm by means of a cerium oxide slurry so that the surface roughness would be from 0.3 to 0.4 nm as measured by an atomic force microscope, was prepared.

Firstly, a suede abrasive cloth was mounted on a polishing plate of a small single-side polishing machine manufactured by Hamai Co., Ltd. and subjected to truing by means of a diamond dresser. This abrasive cloth was washed with pure water and by means of a brush, and then polishing operation was carried out by supplying a colloidal silica slurry with an average particle size of 30 nm having the pH adjusted to 2. The polishing pressure was 10 kPa, the sun gear rotational speed was 40 rpm, and the polishing time was 20 minutes.

After the polishing, each glass was washed with pure water and an alkaline cleanser and then dried by blowing dry air thereto.

The surface roughness Ra of each glass thus obtained was measured by means of an atomic force microscope SPA400, manufactured by SII NanoTechnology Inc. The results are shown in the section for "Surface roughness" (unit: nm) in the Tables. The surface roughness Ra thus obtained is referred to as AFM-Ra in this specification.

FIG. 3 is one wherein the above scattered peak intensity (phase separation property 2) and this AFM-Ra were plotted. From this Fig., it is evident that a positive correlation exists between the two.

TABLE 1

| | Examples | | | | | | | |
|---|---|---|---|---|---|---|---|---|
| | 1 | 2 | 3 | 4 | 5 | 6 | 7 | 8 |
| $SiO_2$ | 57.5 | 60.0 | 60.0 | 62.5 | 63.0 | 63.5 | 65.0 | 65.0 |
| $Al_2O_3$ | 7.5 | 7.5 | 6.5 | 7.5 | 5.5 | 5.5 | 5.0 | 5.0 |
| MgO | 2.0 | 2.0 | 6.0 | 2.0 | 6.5 | 3.6 | 2.0 | 2.0 |
| CaO | 2.0 | 2.0 | 2.0 | 2.0 | 2.0 | 2.0 | 2.0 | 2.0 |
| SrO | 7.0 | 7.0 | 7.0 | 7.0 | 3.2 | 6.8 | 7.0 | 7.0 |
| BaO | 10.0 | 7.5 | 5.5 | 5.0 | 5.5 | 5.0 | 5.0 | 5.0 |
| ZnO | 0 | 0 | 0 | 0 | 0 | 0 | 0 | 0 |
| $TiO_2$ | 1.5 | 1.5 | 2.0 | 1.5 | 1.5 | 1.5 | 1.5 | 1.5 |
| $ZrO_2$ | 3.0 | 3.0 | 3.0 | 3.0 | 3.0 | 3.0 | 3.0 | 3.0 |
| $Li_2O$ | 0 | 0 | 0 | 0 | 0 | 0 | 0 | 0 |
| $Na_2O$ | 4.0 | 4.0 | 1.0 | 4.0 | 1.3 | 1.1 | 1.5 | 4.0 |

TABLE 1-continued

|  | Examples | | | | | | | |
| --- | --- | --- | --- | --- | --- | --- | --- | --- |
|  | 1 | 2 | 3 | 4 | 5 | 6 | 7 | 8 |
| $K_2O$ | 4.0 | 4.0 | 5.0 | 4.0 | 7.0 | 6.5 | 6.5 | 4.0 |
| $La_2O_3$ | 1.5 | 1.5 | 2.0 | 1.5 | 1.5 | 1.5 | 1.5 | 1.5 |
| RO | 21.0 | 18.5 | 20.5 | 16.0 | 17.2 | 17.4 | 16.0 | 16.0 |
| $R_2O$ | 8.0 | 8.0 | 6.0 | 8.0 | 8.3 | 7.6 | 8.0 | 8.0 |
| LiNa/K | 1.00 | 1.00 | 0.20 | 1.00 | 0.19 | 0.17 | 0.23 | 1.00 |
| Al(ZrKLa)/RO | 3.04 | 3.45 | 3.17 | 3.98 | 3.68 | 3.48 | 3.44 | 2.66 |
| LaTi•CaMg/Zr | 4 | 4 | 10.67 | 4 | 8.5 | 5.6 | 4 | 4 |
| Tg | 682 | 691 | 736 | 697 | 711 | 716 | 707 | 681 |
| α | 84 | 82 | 75 | 79 | 80 | 78 | 79 | 80 |
| d | 3.22 | 3.12 | 3.10 | 3.01 | 2.95 | 3.00 | 3.00 | 3.00 |
| E | 83.4* | 82.8* | 85.9* | 82.1* | 81.8 | 81.6 | 83.1 | 81.2* |
| E/d | 25.9* | 26.6* | 27.7* | 27.3* | 27.7 | 27.2 | 27.7 | 27.0* |
| $T_4$ | 1117 | 1132 | 1150 | 1164 | 1173 | 1174 | 1166 | 1142 |
| $T_L$ | 1110 | 1130 | 1150 | 1160 | 1170 | 1170 | 1120 | <1100 |
| Phase separation property 1 | — | — | — | — | — | ◎ | — | — |
| Phase separation property 2 | — | — | — | — | — | 43 | — | — |
| Surface roughness | — | — | — | — | — | 0.13 | — | — |

TABLE 2

|  | Examples | | | | | | | |
| --- | --- | --- | --- | --- | --- | --- | --- | --- |
|  | 9 | 10 | 11 | 12 | 13 | 14 | 15 | 16 |
| $SiO_2$ | 66.5 | 67.5 | 64.0 | 63.5 | 62.5 | 63.05 | 63.3 | 63.5 |
| $Al_2O_3$ | 4.0 | 5.0 | 7.0 | 6.5 | 7.0 | 7.0 | 6.8 | 7.0 |
| MgO | 5.0 | 2.0 | 7.0 | 7.5 | 8.5 | 8.1 | 8.3 | 8.0 |
| CaO | 0 | 2.0 | 6.0 | 4.0 | 4.0 | 4.7 | 5.5 | 5.0 |
| SrO | 7.0 | 7.0 | 4.0 | 5.5 | 5.0 | 3.7 | 2.7 | 3.3 |
| BaO | 4.0 | 2.5 | 1.0 | 1.0 | 1.0 | 1.0 | 1.0 | 1.0 |
| ZnO | 0 | 0 | 0 | 0 | 0 | 0 | 0 | 0 |
| $TiO_2$ | 1.0 | 1.5 | 1.0 | 1.5 | 1.5 | 1.5 | 1.5 | 1.0 |
| $ZrO_2$ | 2.5 | 3.0 | 1.25 | 1.5 | 1.5 | 1.5 | 1.5 | 1.65 |
| $Li_2O$ | 0 | 0 | 0 | 0 | 0 | 0 | 0 | 0 |
| $Na_2O$ | 3.0 | 4.0 | 2.0 | 3.0 | 2.5 | 2.6 | 2.7 | 2.6 |
| $K_2O$ | 5.0 | 4.0 | 5.75 | 5.0 | 5.5 | 5.6 | 5.5 | 5.7 |
| $La_2O_3$ | 2.0 | 1.5 | 1.0 | 1.0 | 1.0 | 1.25 | 1.2 | 1.25 |
| RO | 16.0 | 13.5 | 18.0 | 18.0 | 18.5 | 17.5 | 17.5 | 17.3 |
| $R_2O$ | 8.0 | 8.0 | 7.75 | 8.0 | 8.0 | 8.2 | 8.2 | 8.3 |
| LiNa/K | 0.60 | 1.00 | 0.35 | 0.60 | 0.45 | 0.46 | 0.49 | 0.46 |
| Al(ZrKLa)/RO | 2.38 | 3.15 | 3.11 | 2.71 | 3.03 | 3.34 | 3.19 | 3.48 |
| LaTi•CaMg/Zr | 6 | 4 | 20.8 | 19.17 | 20.83 | 23.47 | 24.84 | 17.73 |
| Tg | 687 | 690 | 708 | 695 | 709 | 710 | 710 | 711 |
| α | 76 | 77 | 78 | 79 | 75 | 78 | 79 | 78 |
| d | 2.98 | 2.90 | 2.74 | 2.78 | 2.78 | 2.77 | 2.75 | 2.76 |
| E | 83.4* | 80.6* | 81.2 | 82.0 | 82.1 | 81.6 | 81.8 | 81.5 |
| E/d | 25.9* | 27.8* | 29.6 | 29.4 | 29.5 | 29.5 | 29.8 | 29.6 |
| $T_4$ | 1146 | 1176 | 1184 | 1154* | 1167* | 1170 | 1147 | 1177 |
| $T_L$ | 1130 | 1140 | 1160 | 1120 | 1170 | 1140 | 1145 | 1160 |
| Phase separation property 1 | — | — | — | — | — | ○ | Δ | ○ |
| Phase separation property 2 | — | — | — | — | — | — | — | 843 |
| Surface roughness | — | — | — | — | — | — | — | 0.17 |

TABLE 3

| | Examples | | | | | | | |
|---|---|---|---|---|---|---|---|---|
| | 17 | 18 | 19 | 20 | 21 | 22 | 23 | 24 |
| $SiO_2$ | 63.7 | 62.5 | 65.0 | 63.0 | 63.0 | 64.0 | 64.5 | 63.5 |
| $Al_2O_3$ | 6.5 | 6.5 | 7.5 | 6.5 | 6.5 | 7.0 | 5.5 | 5.5 |
| MgO | 4.0 | 7.0 | 2.0 | 3.5 | 6.0 | 7.0 | 0 | 3.0 |
| CaO | 2.0 | 1.0 | 2.0 | 2.0 | 0 | 5.0 | 3.0 | 2.0 |
| SrO | 7.0 | 2.0 | 7.0 | 5.0 | 6.5 | 6.0 | 7.8 | 7.6 |
| BaO | 3.0 | 7.0 | 2.5 | 4.5 | 3.5 | 1.5 | 5.0 | 5.9 |
| ZnO | 0 | 0 | 0 | 0 | 0 | 0 | 0 | 0 |
| $TiO_2$ | 1.5 | 1.0 | 1.5 | 2.0 | 2.0 | 0 | 1.5 | 1.5 |
| $ZrO_2$ | 2.6 | 2.5 | 3.0 | 3.5 | 2.5 | 1.0 | 2.5 | 3.0 |
| $Li_2O$ | 0 | 0 | 0 | 0 | 0 | 0 | 0 | 0 |
| $Na_2O$ | 1.5 | 2.0 | 4.0 | 2.0 | 1.5 | 1.8 | 2.2 | 0 |
| $K_2O$ | 6.7 | 6.5 | 4.0 | 6.0 | 6.5 | 5.7 | 6.5 | 6.5 |
| $La_2O_3$ | 1.5 | 2.0 | 1.5 | 2.0 | 2.0 | 1.0 | 1.5 | 1.5 |
| RO | 16.0 | 17.0 | 13.5 | 15.0 | 16.0 | 19.5 | 15.8 | 18.5 |
| $R_2O$ | 8.2 | 8.5 | 8.0 | 8.0 | 8.0 | 7.5 | 8.7 | 6.5 |
| LiNa/K | 0.22 | 0.31 | 1.00 | 0.33 | 0.23 | 0.32 | 0.34 | 0 |
| Al(ZrKLa)/RO | 4.39 | 4.21 | 4.72 | 4.98 | 4.47 | 2.76 | 3.66 | 3.27 |
| LaTi•CaMg/Zr | 6.92 | 9.6 | 4 | 6.29 | 9.6 | 12 | 3.6 | 5 |
| Tg | 702 | 711 | 701* | 727 | 725 | 705* | 694* | 730* |
| α | 79.5* | 81.0 | 74.3* | 77.9 | 78.1 | 77.7* | 82.4* | 75.7* |
| d | 2.92* | 2.99* | 2.90* | 3.00* | 2.96* | 2.78* | 3.00* | 3.05* |
| E | 80.4* | 80.7* | 81.5* | 82.2* | 81.8* | 80.3* | 78.1* | 81.3* |
| E/d | 27.5* | 26.9* | 28.1* | 27.4* | 27.6* | 28.8* | 26.0* | 26.6* |
| $T_4$ | 1172 | 1178 | 1182* | 1171 | 1156 | 1168* | 1156* | 1174* |
| $T_L$ | 1210 | 1220 | 1230 | 1200 | 1220 | | | |
| Phase separation property 1 | — | — | — | — | — | | | |
| Phase separation property 2 | | | | | | | | |
| Surface roughness | — | — | — | — | — | | | |

TABLE 4

| | Examples | | | | | | | |
|---|---|---|---|---|---|---|---|---|
| | 25 | 26 | 27 | 28 | 29 | 30 | 31 | 32 |
| $SiO_2$ | 64.55 | 67.0 | 69.0 | 66.5 | 67.0 | 65.0 | 65.0 | 65.4 |
| $Al_2O_3$ | 6.0 | 5.0 | 4.0 | 7.5 | 7.5 | 7.5 | 7.2 | 7.4 |
| MgO | 3.2 | 2.5 | 4.5 | 6.0 | 6.0 | 6.0 | 8.0 | 7.8 |
| CaO | 2.0 | 2.0 | 2.0 | 6.0 | 6.0 | 6.0 | 4.0 | 4.7 |
| SrO | 4.5 | 6.1 | 2.5 | 2.5 | 2.5 | 2.5 | 2.5 | 1.8 |
| BaO | 5.0 | 3.0 | 1.0 | 0 | 0 | 0 | 2.0 | 0.8 |
| ZnO | 0 | 0 | 0 | 0 | 0 | 0 | 0 | 0 |
| $TiO_2$ | 1.5 | 1.5 | 2.0 | 0.5 | 0 | 0 | 0 | 0 |
| $ZrO_2$ | 3.0 | 3.0 | 3.0 | 1.0 | 1.0 | 3.0 | 1.7 | 1.8 |
| $Li_2O$ | 2.5 | 0 | 0 | 0 | 0 | 0 | 0 | 0 |
| $Na_2O$ | 1.0 | 4.9 | 4.5 | 4.0 | 4.0 | 4.0 | 3.0 | 4.2 |
| $K_2O$ | 5.0 | 3.5 | 5.5 | 5.0 | 5.0 | 5.0 | 5.6 | 5.0 |
| $La_2O_3$ | 1.75 | 1.5 | 2.0 | 1.0 | 1.0 | 1.0 | 1.0 | 1.1 |
| RO | 14.7 | 13.6 | 10.0 | 14.5 | 14.5 | 14.5 | 16.5 | 15.1 |
| $R_2O$ | 8.5 | 8.4 | 10.0 | 9.0 | 9.0 | 9.0 | 8.6 | 9.2 |
| LiNa/K | 0.70 | 1.40 | 0.82 | 0.80 | 0.80 | 0.80 | 0.54 | 0.84 |
| Al(ZrKLa)/RO | 3.98 | 2.94 | 4.2 | 3.62 | 3.62 | 4.66 | 3.62 | 3.87 |
| LaTi•CaMg/Zr | 5.63 | 4.5 | 8.7 | 18 | 12 | 4 | 7.06 | 7.64 |
| Tg | 680* | 683* | 688* | 703 | 703 | 722 | 696 | 694 |
| α | 75.1* | 75.3* | 77.7* | 77 | 77 | 76 | 76 | 76 |
| d | 2.97* | 2.90* | 2.79* | 2.65 | 2.64 | 2.70 | 2.74 | 2.69 |
| E | 83.4* | 80.9* | 79.0* | 80.4 | 79.8 | 83.1 | 81.2 | 81.9 |
| E/d | 28.1* | 27.9* | 28.4* | 30.4 | 30.3 | 30.8 | 29.7 | 30.4 |
| $T_4$ | 1144* | 1156* | 1171* | — | — | — | 1195 | — |
| $T_L$ | | | | 1160 | 1160 | >1200 | <1100 | 1160 |
| Phase separation property 1 | | | | — | — | — | — | — |

TABLE 4-continued

|  | Examples | | | | | | | |
| --- | --- | --- | --- | --- | --- | --- | --- | --- |
|  | 25 | 26 | 27 | 28 | 29 | 30 | 31 | 32 |
| Phase separation property 2 |  |  |  | 245 | 210 | 86 | 65 | — |
| Surface roughness |  |  |  | 0.16 | 0.14 | 0.14 | 0.13 | — |

TABLE 5

|  | Examples | | | | | | | |
| --- | --- | --- | --- | --- | --- | --- | --- | --- |
|  | 33 | 34 | 35 | 36 | 37 | 38 | 39 | 40 |
| $SiO_2$ | 64.3 | 66.0 | 66.5 | 66.5 | 66.5 | 66.5 | 65.8 | 65.9 |
| $Al_2O_3$ | 7.4 | 7.4 | 7.4 | 7.4 | 7.7 | 7.4 | 8.0 | 7.5 |
| MgO | 8.0 | 5.0 | 6.5 | 6.5 | 7.0 | 7.0 | 5.5 | 6.5 |
| CaO | 5.8 | 5.0 | 2.5 | 0 | 1.0 | 1.0 | 0 | 0 |
| SrO | 1.7 | 3.0 | 3.5 | 6.0 | 4.0 | 4.0 | 6.0 | 5.9 |
| BaO | 0.6 | 0.6 | 0.6 | 0.6 | 0.6 | 0.6 | 0.6 | 0.6 |
| ZnO | 0 | 0 | 0 | 0 | 0 | 0 | 0 | 0 |
| $TiO_2$ | 0 | 0 | 0 | 0 | 0 | 0 | 0 | 0 |
| $ZrO_2$ | 1.8 | 2.5 | 2.0 | 2.0 | 2.0 | 2.0 | 2.5 | 2.5 |
| $Li_2O$ | 0 | 0 | 0 | 0 | 0 | 0 | 0 | 0 |
| $Na_2O$ | 4.2 | 4.5 | 4.5 | 4.5 | 4.3 | 4.3 | 4.3 | 4.0 |
| $K_2O$ | 5.45 | 5.5 | 5.5 | 5.5 | 5.9 | 5.9 | 6.3 | 6.3 |
| $La_2O_3$ | 0.75 | 0.5 | 1.0 | 1.0 | 1.0 | 1.3 | 1.0 | 0.8 |
| RO | 16.1 | 13.6 | 13.1 | 13.1 | 12.6 | 12.6 | 12.1 | 13.0 |
| $R_2O$ | 9.65 | 10.0 | 10.0 | 10.0 | 10.2 | 10.2 | 10.6 | 10.3 |
| LiNa/K | 0.77 | 0.82 | 0.82 | 0.82 | 0.73 | 0.73 | 0.68 | 0.63 |
| Al(ZrKLa)/RO | 3.68 | 4.63 | 4.80 | 4.80 | 5.44 | 5.40 | 6.48 | 5.54 |
| LaTi•CaMg/Zr | 5.75 | 2 | 4.5 | 3.25 | 4 | 5.2 | 2.2 | 2.08 |
| Tg | 689 | 684 | 685 | 688 | 691 | 693 | 696 | 694 |
| α | 80 | 78 | 78 | 78 | 79 | 79 | 80 | 77 |
| d | 2.66 | 2.67 | 2.70 | 2.73 | 2.69 | 2.71 | 2.74 | 2.72 |
| E | 81.2 | 80.6 | 80.4 | 79.8 | 79.5 | 79.9 | 78.9 | 79.5 |
| E/d | 30.5 | 30.2 | 29.8 | 29.2 | 29.6 | 29.5 | 28.8 | 29.2 |
| $T_4$ | — | — | — | — | — | — | — | — |
| $T_L$ | 1170 | 1140 | 1120 | <1100 | 1120 | 1160 | 1180 | 1140 |
| Phase separation property 1 | — | — | — | — | — | — | — | — |
| Phase separation property 2 | — | 21 | 114 | 29 | 72 | — | 33 | 17 |
| Surface roughness | — | 0.10 | — | — | 0.12 | 0.11 | 0.10 | — |

TABLE 6

|  | Examples | | | | | | | |
| --- | --- | --- | --- | --- | --- | --- | --- | --- |
|  | 41 | 42 | 43 | 44 | 45 | 46 | 47 | 48 |
| $SiO_2$ | 66.3 | 66.1 | 66.0 | 65.8 | 66.0 | 67.0 | 67.3 | 66.4 |
| $Al_2O_3$ | 7.7 | 7.6 | 7.2 | 7.5 | 7.5 | 7.5 | 7.4 | 7.5 |
| MgO | 4.5 | 4.7 | 8.0 | 8.0 | 8.5 | 5.0 | 5.5 | 5.6 |
| CaO | 4.5 | 4.7 | 6.0 | 6.0 | 6.0 | 3.5 | 5.5 | 5.6 |
| SrO | 3.2 | 3.2 | 1.0 | 1.0 | 0.5 | 4.2 | 2.0 | 2.3 |
| BaO | 0 | 0.2 | 0 | 0 | 0 | 0 | 0 | 0 |
| ZnO | 0 | 0 | 0 | 0 | 0 | 0 | 0 | 0 |
| $TiO_2$ | 0 | 0 | 0 | 0 | 0 | 0 | 0 | 0 |
| $ZrO_2$ | 2.5 | 2.5 | 1.8 | 1.7 | 1.5 | 2.5 | 2.0 | 2.2 |
| $Li_2O$ | 0 | 0 | 0 | 0 | 0 | 0 | 0 | 0 |
| $Na_2O$ | 4.6 | 4.7 | 6.5 | 6.5 | 6.5 | 6.0 | 5.8 | 5.7 |
| $K_2O$ | 6.0 | 5.6 | 2.5 | 2.5 | 2.5 | 3.5 | 3.7 | 3.8 |
| $La_2O_3$ | 0.7 | 0.7 | 1.0 | 1.0 | 1.0 | 0.8 | 0.8 | 0.9 |
| RO | 12.2 | 12.8 | 15.0 | 15.0 | 15.0 | 12.7 | 13.0 | 13.5 |
| $R_2O$ | 10.6 | 10.3 | 9.0 | 9.0 | 9.0 | 9.5 | 9.5 | 9.5 |
| LiNa/K | 0.77 | 0.84 | 2.6 | 2.6 | 2.6 | 1.71 | 1.57 | 1.50 |
| Al(ZrKLa)/RO | 5.81 | 5.23 | 2.54 | 2.60 | 2.50 | 4.02 | 3.70 | 3.83 |
| LaTi•CaMg/Zr | 2.52 | 2.63 | 7.78 | 8.24 | 9.67 | 2.72 | 4.4 | 4.58 |
| Tg | 690 | 695 | 689 | 694 | 694 | 694 | 694 | 690 |

TABLE 6-continued

|  | Examples | | | | | | | |
|---|---|---|---|---|---|---|---|---|
|  | 41 | 42 | 43 | 44 | 45 | 46 | 47 | 48 |
| α | 80 | 81 | 75 | 75 | 75 | 76 | 77 | 78 |
| d | 2.66 | 2.67 | 2.65 | 2.65 | 2.63 | 2.68 | 2.63 | 2.66 |
| E | 80.2 | 80.4 | 83.4 | 83.0 | 83.2 | 80.5 | 80.8 | 82.1 |
| E/d | 30.2 | 30.2 | 31.5 | 31.4 | 31.6 | 30.0 | 30.7 | 30.9 |
| $T_4$ | 1236 | — | — | 1165 | — | — | — | — |
| $T_L$ | 1150 | 1150 | 1170 | 1170 | 1190 | 1160 | 1150 | 1140 |
| Phase separation property 1 | — | — | — | — | — | — | — | — |
| Phase separation property 2 | 31 | — | 92 | — | — | 30 | 57 | — |
| Surface roughness | 0.10 | — | 0.13 | 0.12 | — | — | — | — |

TABLE 7

|  | Examples | | | | | | | |
|---|---|---|---|---|---|---|---|---|
|  | 49 | 50 | 51 | 52 | 53 | 54 | 55 | 56 |
| $SiO_2$ | 63.0 | 63.0 | 67.5 | 65.0 | 62.5 | 60.0 | 57.5 | 62.5 |
| $Al_2O_3$ | 7.5 | 7.5 | 5.0 | 7.5 | 10.0 | 10.0 | 10.0 | 6.0 |
| MgO | 6.0 | 7.5 | 2.0 | 6.0 | 2.0 | 2.0 | 2.0 | 4.0 |
| CaO | 5.0 | 5.0 | 2.0 | 6.0 | 2.0 | 2.0 | 2.0 | 1.5 |
| SrO | 1.75 | 1.75 | 7.0 | 2.5 | 7.0 | 7.0 | 7.0 | 5.5 |
| BaO | 1.5 | 1.5 | 2.5 | 0 | 2.5 | 5.0 | 7.5 | 5.0 |
| ZnO | 0 | 0 | 0 | 0 | 0 | 0 | 0 | 0 |
| $TiO_2$ | 1.5 | 1.5 | 1.5 | 2.0 | 1.5 | 1.5 | 1.5 | 2.0 |
| $ZrO_2$ | 3.0 | 1.5 | 3.0 | 1.0 | 3.0 | 3.0 | 3.0 | 4.0 |
| $Li_2O$ | 1.5 | 1.5 | 0 | 0 | 0 | 0 | 0 | 0 |
| $Na_2O$ | 2.0 | 2.0 | 4.8 | 4.0 | 4.0 | 4.0 | 4.0 | 2.0 |
| $K_2O$ | 6.25 | 6.25 | 3.2 | 5.0 | 4.0 | 4.0 | 4.0 | 5.5 |
| $La_2O_3$ | 1.0 | 1.0 | 1.5 | 1.0 | 1.5 | 1.5 | 1.5 | 2.0 |
| RO | 14.25 | 15.75 | 13.5 | 14.5 | 13.5 | 16.0 | 18.5 | 16.0 |
| $R_2O$ | 9.75 | 9.25 | 8.0 | 9.0 | 8.0 | 8.0 | 8.0 | 7.5 |
| LiNa/K | 0.56 | 0.56 | 1.50 | 0.80 | 1.00 | 1.00 | 1.00 | 0.36 |
| Al(ZrKLa)/RO | 5.92 | 4.17 | 2.85 | 3.62 | 6.30 | 5.31 | 4.59 | 4.31 |
| LaTi·CaMg/Zr | 9.17 | 20.83 | 4 | 36 | 4 | 4 | 4 | 5.5 |
| Tg | 666 | 663 | 679* | 702 | 715* | 714* | 713* | 724* |
| α | 75.2 | 81.5 | 77.0* | 83 | 74.0* | 77.4* | 80.7* | 76.8* |
| d | 2.67 | 2.73 | 2.90* | 2.67 | 2.91* | 3.02* | 3.12* | 3.05* |
| E | 81.9 | 82.1 | 81.2* | 81.0 | 82.4* | 83.0* | 83.7* | 83.8* |
| E/d | 30.7 | 30.1 | 28.0* | 30.4 | 28.3* | 27.5* | 26.8* | 27.5* |
| $T_4$ | 1210* | 1166* | 1158* | — | 1197* | 1170* | 1150* | 1159* |
| $T_L$ | >1300 | 1190 | — | 1160 | 1240 | 1280 | 1230 | 1270 |
| Phase separation property 1 | — | — | — | — | — | — | — | — |
| Phase separation property 2 | — | — | — | 671 | — | — | — | — |
| Surface roughness | — | — | — | 0.20 | — | — | — | — |

TABLE 8

|  | Examples | | | | | | | | |
|---|---|---|---|---|---|---|---|---|---|
|  | 57 | 58 | 59 | 60 | 61 | 62 | 63 | 64 | 65 |
| $SiO_2$ | 61.25 | 55.0 | 55.0 | 58.5 | 56.5 | 57.5 | 66.5 | 60.0 | 65.0 |
| $Al_2O_3$ | 7.5 | 14.0 | 10.0 | 12.0 | 12.0 | 11.0 | 4.7 | 8.5 | 7.5 |
| MgO | 7.0 | 2.0 | 3.0 | 3.0 | 2.0 | 2.0 | 3.4 | 7.0 | 6.0 |
| CaO | 8.0 | 2.0 | 5.0 | 3.0 | 2.0 | 2.0 | 6.2 | 4.5 | 8.0 |
| SrO | 2.25 | 4.75 | 8.0 | 7.0 | 6.5 | 5.0 | 4.7 | 7.0 | 2.5 |
| BaO | 0 | 8.0 | 0 | 4.0 | 8.0 | 8.0 | 3.6 | 0 | 0 |
| ZnO | 0 | 0 | 0 | 0 | 0 | 2.0 | 0 | 0 | 0 |
| $TiO_2$ | 1.5 | 2.0 | 3.5 | 0 | 2.0 | 1.0 | 0 | 3.5 | 0 |
| $ZrO_2$ | 3.0 | 2.5 | 2.0 | 3.0 | 2.5 | 2.0 | 1.7 | 1.0 | 1.0 |
| $Li_2O$ | 0.8 | 0 | 0 | 0 | 0 | 0 | 0 | 0 | 0 |

TABLE 8-continued

|  | Examples | | | | | | | | |
|---|---|---|---|---|---|---|---|---|---|
|  | 57 | 58 | 59 | 60 | 61 | 62 | 63 | 64 | 65 |
| $Na_2O$ | 1.2 | 3.0 | 3.5 | 1.0 | 2.75 | 3.0 | 4.8 | 4.0 | 4.0 |
| $K_2O$ | 6.5 | 5.0 | 5.0 | 6.0 | 4.0 | 4.0 | 4.4 | 4.5 | 5.0 |
| $La_2O_3$ | 1.0 | 1.75 | 5.0 | 2.5 | 1.75 | 2.5 | 0 | 0 | 1.0 |
| RO | 17.25 | 16.75 | 16.0 | 17.0 | 18.5 | 17.0 | 17.9 | 18.5 | 16.5 |
| $R_2O$ | 8.5 | 8.0 | 8.5 | 7.0 | 6.75 | 7.0 | 9.2 | 8.5 | 9.0 |
| LiNa/K | 0.31 | 0.6 | 0.7 | 0.17 | 0.69 | 0.75 | 1.09 | 0.89 | 0.80 |
| Al(ZrKLa)/RO | 4.57 | 7.73 | 7.5 | 8.12 | 5.35 | 5.5 | 1.6 | 2.53 | 3.18 |
| LaTi•CaMg/Zr | 12.5 | 6 | 34 | 5 | 6 | 7 | 0 | 40.25 | 14 |
| Tg | 709 | 741 | 739 | 768 | 733 | 717 | 691 | 691 | 698 |
| α | 76.9 | 79.0 | 84.8 | 75.4 | 78.7 | 78.6 | 81 | 81 | 80 |
| d | 2.74 | 3.08 | 2.96 | 3.05 | 3.13 | 3.18 | 2.77 | 2.71 | 2.67 |
| E | 85.4 | 83.7 | 86.4 | 82.9 | 86.3* | 82.8 | 76.5 | 82.4 | 81.3 |
| E/d | 31.2 | 27.1 | 29.2 | 27.2 | 27.2* | 26.1 | 27.6 | 30.4 | 30.5 |
| $T_4$ | 1178* | 1203* | 1019* | 1169* | 1173 | 1175* | 1145 | 1147 | — |
| $T_L$ | >1300 | >1300 | >1300 | >1300 | >1300 | 1290 | 1080 | 1140 | 1160 |
| Phase separation property 1 | — | X | — | — | — | — | — | — | — |
| Phase separation property 2 | — | — | — | — | — | — | 12 | 954 | 354 |
| Surface roughness | — | — | — | — | — | — | 0.10 | 0.17 | 0.18 |

TABLE 9

|  | Examples | | | | | | | |
|---|---|---|---|---|---|---|---|---|
|  | 1 | 2 | 3 | 4 | 5 | 6 | 7 | 8 |
| $SiO_2$ | 41.75 | 44.83 | 45.61 | 48.10 | 49.72 | 49.14 | 50.17 | 50.70 |
| $Al_2O_3$ | 9.24 | 9.51 | 8.38 | 9.79 | 7.37 | 7.22 | 6.55 | 6.62 |
| MgO | 0.97 | 1.00 | 3.06 | 1.03 | 3.44 | 1.87 | 1.04 | 1.05 |
| CaO | 1.36 | 1.39 | 1.42 | 1.44 | 1.47 | 1.44 | 1.44 | 1.46 |
| SrO | 8.77 | 9.02 | 9.18 | 9.29 | 4.36 | 9.08 | 9.32 | 9.42 |
| BaO | 18.53 | 14.30 | 10.67 | 9.82 | 11.08 | 9.88 | 9.85 | 9.95 |
| ZnO | 0 | 0 | 0 | 0 | 0 | 0 | 0 | 0 |
| $TiO_2$ | 1.45 | 1.49 | 2.02 | 1.54 | 1.57 | 1.54 | 1.54 | 1.56 |
| $ZrO_2$ | 4.47 | 4.60 | 4.68 | 4.73 | 4.86 | 4.76 | 4.75 | 4.80 |
| $Li_2O$ | 0 | 0 | 0 | 0 | 0 | 0 | 0 | 0 |
| $Na_2O$ | 3.00 | 3.08 | 0.78 | 3.18 | 1.06 | 0.88 | 1.19 | 3.22 |
| $K_2O$ | 4.55 | 4.69 | 5.96 | 4.83 | 8.66 | 7.89 | 7.87 | 4.89 |
| $La_2O_3$ | 5.91 | 6.08 | 8.24 | 6.26 | 6.42 | 6.30 | 6.28 | 6.34 |

TABLE 10

|  | Examples | | | | | | | |
|---|---|---|---|---|---|---|---|---|
|  | 9 | 10 | 11 | 12 | 13 | 14 | 15 | 16 |
| $SiO_2$ | 52.30 | 54.29 | 55.16 | 54.38 | 53.56 | 53.89 | 54.69 | 54.38 |
| $Al_2O_3$ | 5.34 | 6.83 | 10.24 | 9.45 | 10.18 | 10.15 | 9.97 | 10.17 |
| MgO | 2.64 | 1.08 | 4.05 | 4.31 | 4.89 | 4.64 | 4.81 | 4.60 |
| CaO | 0 | 1.50 | 4.83 | 3.20 | 3.20 | 3.75 | 4.44 | 4.00 |
| SrO | 9.49 | 9.71 | 5.95 | 8.12 | 7.39 | 5.45 | 4.02 | 4.87 |
| BaO | 8.03 | 5.13 | 2.20 | 2.19 | 2.19 | 2.18 | 2.21 | 2.19 |
| ZnO | 0 | 0 | 0 | 0 | 0 | 0 | 0 | 0 |
| $TiO_2$ | 1.05 | 1.60 | 1.15 | 1.71 | 1.71 | 1.71 | 1.72 | 1.14 |
| $ZrO_2$ | 4.03 | 4.95 | 2.21 | 2.63 | 2.64 | 2.63 | 2.66 | 2.90 |
| $Li_2O$ | 0 | 0 | 0 | 0 | 0 | 0 | 0 | 0 |
| $Na_2O$ | 2.43 | 3.32 | 1.78 | 2.65 | 2.21 | 2.29 | 2.41 | 2.30 |
| $K_2O$ | 6.17 | 5.04 | 7.77 | 6.71 | 7.39 | 7.50 | 7.45 | 7.65 |
| $La_2O_3$ | 8.53 | 6.54 | 4.67 | 4.64 | 4.65 | 5.79 | 5.62 | 5.81 |

TABLE 11

|  | Examples | | | | | | | |
|---|---|---|---|---|---|---|---|---|
|  | 17 | 18 | 19 | 20 | 21 | 22 | 23 | 24 |
| $SiO_2$ | 45.45 | 42.30 | 50.53 | 47.89 | 44.72 | 46.73 | 44.04 | 43.78 |
| $Al_2O_3$ | 16.10 | 18.27 | 8.75 | 8.45 | 13.20 | 14.42 | 13.00 | 15.50 |
| MgO | 1.59 | 1.03 | 2.13 | 3.60 | 1.57 | 1.71 | 1.54 | 1.53 |
| CaO | 2.21 | 1.44 | 1.48 | 0.72 | 3.63 | 3.97 | 3.57 | 3.55 |
| SrO | 10.91 | 6.30 | 9.58 | 2.64 | 10.73 | 11.72 | 10.57 | 10.50 |
| BaO | 0 | 15.70 | 6.07 | 13.69 | 0 | 0 | 0 | 0 |
| ZnO | 0 | 0 | 0 | 0 | 0 | 0 | 0 | 0 |
| $TiO_2$ | 1.58 | 2.05 | 1.58 | 1.02 | 3.62 | 3.96 | 1.53 | 1.52 |
| $ZrO_2$ | 6.48 | 3.94 | 4.23 | 3.93 | 3.19 | 3.49 | 3.14 | 3.12 |
| $Li_2O$ | 0 | 0 | 0 | 0 | 0 | 0 | 0 | 0 |
| $Na_2O$ | 2.85 | 2.38 | 1.23 | 1.58 | 2.81 | 3.07 | 2.77 | 2.75 |
| $K_2O$ | 6.20 | 6.03 | 8.33 | 7.81 | 6.10 | 6.66 | 6.00 | 5.97 |
| $La_2O_3$ | 10.72 | 7.30 | 6.45 | 8.31 | 10.54 | 23.04 | 18.69 | 10.32 |

TABLE 12

|  | Examples | | | | | | | |
|---|---|---|---|---|---|---|---|---|
|  | 25 | 26 | 27 | 28 | 29 | 30 | 31 | 32 |
| $SiO_2$ | 45.27 | 46.36 | 47.73 | 58.71 | 59.24 | 56.42 | 55.78 | 57.09 |
| $Al_2O_3$ | 13.36 | 16.42 | 16.91 | 11.24 | 11.25 | 11.05 | 10.49 | 10.96 |
| MgO | 1.58 | 2.70 | 2.78 | 3.55 | 3.56 | 3.49 | 4.61 | 4.57 |
| CaO | 3.67 | 0.75 | 0 | 4.94 | 4.95 | 4.86 | 3.20 | 3.83 |
| SrO | 10.86 | 11.12 | 11.45 | 3.81 | 3.81 | 3.74 | 3.70 | 2.71 |
| BaO | 0 | 0 | 0 | 0 | 0 | 0 | 4.38 | 1.78 |
| ZnO | 0 | 0 | 0 | 0 | 0 | 0 | 0 | 0 |
| $TiO_2$ | 1.57 | 1.61 | 1.66 | 0.59 | 0 | 0 | 0 | 0 |
| $ZrO_2$ | 6.46 | 6.61 | 6.81 | 1.81 | 1.81 | 5.34 | 2.99 | 3.22 |
| $Li_2O$ | 0 | 0 | 0 | 0 | 0 | 0 | 0 | 0 |
| $Na_2O$ | 2.84 | 2.91 | 3.00 | 3.64 | 3.65 | 3.58 | 2.66 | 3.78 |
| $K_2O$ | 6.17 | 6.32 | 6.51 | 6.92 | 6.93 | 6.80 | 7.54 | 6.84 |
| $La_2O_3$ | 10.67 | 10.93 | 15.76 | 4.79 | 4.79 | 4.71 | 4.65 | 5.21 |

TABLE 13

| | Examples | | | | | | | |
|---|---|---|---|---|---|---|---|---|
| | 33 | 34 | 35 | 36 | 37 | 38 | 39 | 40 |
| $SiO_2$ | 57.03 | 57.70 | 57.27 | 56.31 | 56.92 | 56.38 | 54.92 | 55.77 |
| $Al_2O_3$ | 11.14 | 10.98 | 10.82 | 10.63 | 11.18 | 10.65 | 11.33 | 10.77 |
| MgO | 4.76 | 2.93 | 3.76 | 3.69 | 4.02 | 3.98 | 3.08 | 3.69 |
| CaO | 4.80 | 4.08 | 2.01 | 0 | 0.80 | 0.79 | 0 | 0 |
| SrO | 2.60 | 4.52 | 5.20 | 8.76 | 5.90 | 5.85 | 8.64 | 8.61 |
| BaO | 1.36 | 1.34 | 1.32 | 1.30 | 1.31 | 1.30 | 1.28 | 1.30 |
| ZnO | 0 | 0 | 0 | 0 | 0 | 0 | 0 | 0 |
| $TiO_2$ | 0 | 0 | 0 | 0 | 0 | 0 | 0 | 0 |
| $ZrO_2$ | 3.27 | 4.48 | 3.53 | 3.47 | 3.51 | 3.48 | 4.28 | 4.34 |
| $Li_2O$ | 0 | 0 | 0 | 0 | 0 | 0 | 0 | 0 |
| $Na_2O$ | 3.84 | 4.06 | 4.00 | 3.93 | 3.80 | 3.76 | 3.70 | 3.49 |
| $K_2O$ | 7.58 | 7.54 | 7.43 | 7.30 | 7.92 | 7.84 | 8.24 | 8.36 |
| $La_2O_3$ | 3.61 | 2.37 | 4.67 | 4.59 | 4.64 | 5.98 | 4.53 | 3.67 |

TABLE 14

| | Examples | | | | | | | |
|---|---|---|---|---|---|---|---|---|
| | 41 | 42 | 43 | 44 | 45 | 46 | 47 | 48 |
| $SiO_2$ | 57.56 | 57.42 | 59.65 | 59.41 | 59.99 | 58.40 | 59.90 | 58.60 |
| $Al_2O_3$ | 11.35 | 11.20 | 11.04 | 11.49 | 11.57 | 11.09 | 11.18 | 11.23 |
| MgO | 2.62 | 2.74 | 4.85 | 4.85 | 5.18 | 2.92 | 3.28 | 3.32 |
| CaO | 3.65 | 3.81 | 5.06 | 5.06 | 5.09 | 2.85 | 4.57 | 4.61 |
| SrO | 4.79 | 4.79 | 1.56 | 1.56 | 0.78 | 6.31 | 3.07 | 3.50 |
| BaO | 0 | 0.44 | 0 | 0 | 0 | 0 | 0 | 0 |
| ZnO | 0 | 0 | 0 | 0 | 0 | 0 | 0 | 0 |
| $TiO_2$ | 0 | 0 | 0 | 0 | 0 | 0 | 0 | 0 |
| $ZrO_2$ | 4.45 | 4.45 | 3.34 | 3.15 | 2.80 | 4.47 | 3.65 | 3.98 |
| $Li_2O$ | 0 | 0 | 0 | 0 | 0 | 0 | 0 | 0 |
| $Na_2O$ | 4.12 | 4.21 | 6.06 | 6.05 | 6.10 | 5.39 | 5.33 | 5.19 |
| $K_2O$ | 8.17 | 7.63 | 3.54 | 3.54 | 3.56 | 4.78 | 5.16 | 5.26 |
| $La_2O_3$ | 3.30 | 3.30 | 4.90 | 4.90 | 4.93 | 3.78 | 3.86 | 4.31 |

TABLE 15

| | Examples | | | | | | | |
|---|---|---|---|---|---|---|---|---|
| | 49 | 50 | 51 | 52 | 53 | 54 | 55 | 56 |
| $SiO_2$ | 49.81 | 50.70 | 46.64 | 57.14 | 46.55 | 45.18 | 43.89 | 43.76 |
| $Al_2O_3$ | 17.34 | 17.65 | 15.15 | 11.19 | 15.93 | 15.46 | 15.02 | 15.50 |
| MgO | 1.71 | 1.74 | 1.09 | 3.54 | 1.57 | 1.53 | 1.48 | 1.53 |
| CaO | 2.38 | 2.43 | 1.51 | 4.92 | 2.19 | 2.13 | 2.07 | 2.13 |
| SrO | 10.28 | 10.46 | 9.80 | 3.79 | 8.10 | 5.24 | 5.09 | 5.25 |
| BaO | 4.35 | 8.85 | 16.56 | 0 | 0 | 0 | 3.77 | 3.88 |
| ZnO | 0 | 0 | 0 | 0 | 0 | 0 | 0 | 0 |
| $TiO_2$ | 0 | 0 | 1.07 | 2.34 | 1.56 | 1.51 | 1.47 | 1.52 |
| $ZrO_2$ | 5.24 | 5.33 | 3.33 | 1.80 | 6.42 | 6.23 | 6.05 | 6.24 |
| $Li_2O$ | 0 | 0 | 0 | 0 | 0 | 0 | 0 | 0 |
| $Na_2O$ | 2.64 | 0.89 | 2.51 | 3.63 | 2.82 | 2.74 | 2.66 | 4.32 |
| $K_2O$ | 8.01 | 8.15 | 5.09 | 6.89 | 6.13 | 8.33 | 5.78 | 5.97 |
| $La_2O_3$ | 11.54 | 11.75 | 8.75 | 4.77 | 10.61 | 10.29 | 10.00 | 10.32 |

TABLE 16

| | Examples | | | | | | | | |
|---|---|---|---|---|---|---|---|---|---|
| | 57 | 58 | 59 | 60 | 61 | 62 | 63 | 64 | 65 |
| $SiO_2$ | 49.82 | 41.85 | 41.14 | 43.21 | 42.06 | 42.07 | 57.74 | 52.97 | 57.54 |
| $Al_2O_3$ | 16.17 | 13.58 | 13.36 | 14.03 | 13.66 | 13.66 | 6.93 | 12.73 | 11.27 |
| MgO | 1.16 | 0.98 | 0.96 | 1.01 | 0.98 | 0.98 | 1.98 | 4.14 | 3.56 |
| CaO | 1.62 | 1.36 | 1.34 | 1.40 | 1.37 | 1.37 | 5.02 | 3.71 | 6.61 |
| SrO | 10.46 | 8.79 | 6.17 | 9.07 | 8.83 | 8.83 | 7.04 | 10.66 | 3.82 |
| BaO | 17.69 | 14.86 | 14.61 | 11.51 | 11.20 | 11.20 | 7.98 | 0 | 0 |
| ZnO | 0 | 0 | 1.94 | 2.04 | 1.98 | 1.98 | 0 | 0 | 0 |
| $TiO_2$ | 1.15 | 0.97 | 0.95 | 1.00 | 0.97 | 0.97 | 0 | 4.11 | 0 |
| $ZrO_2$ | 3.55 | 2.99 | 2.93 | 3.08 | 1.50 | 0 | 3.03 | 1.81 | 1.82 |

TABLE 16-continued

| | Examples | | | | | | | | |
|---|---|---|---|---|---|---|---|---|---|
| | 57 | 58 | 59 | 60 | 61 | 62 | 63 | 64 | 65 |
| $Li_2O$ | 0 | 0 | 0 | 0 | 0 | 0 | 0 | 0 | 0 |
| $Na_2O$ | 2.68 | 2.25 | 2.21 | 2.33 | 2.26 | 2.26 | 4.30 | 3.64 | 3.65 |
| $K_2O$ | 5.43 | 4.56 | 4.49 | 4.71 | 4.59 | 4.59 | 5.99 | 6.23 | 6.94 |
| $La_2O_3$ | 11.75 | 5.94 | 9.70 | 10.19 | 9.92 | 9.92 | 0 | 0 | 4.80 |

INDUSTRIAL APPLICABILITY

The present invention is useful for a data recording medium, its substrate and their production.

The entire disclosure of Japanese Patent Application No. 2008-16550 filed on Jan. 28, 2008 including specification, drawings and summary is incorporated herein by reference in its entirety.

What is claimed is:

1. Glass for a data storage medium substrate, which comprises, as represented by mol percentage based on the following oxides, from 55 to 70% of $SiO_2$, from 2.5 to 9% of $Al_2O_3$, from 0 to 10% of MgO, from 0 to 7% of CaO, from 0.5 to 10% of SrO, from 0 to 12.5% of BaO, from 0 to 2.5% of $TiO_2$, from 0.5 to 3.7% of $ZrO_2$, from 0 to 2.5% of $Li_2O$, from 0 to 8% of $Na_2O$, from 2.5 to 8% of $K_2O$ and from 0.5 to 5% of $La_2O_3$, provided that $Al_2O_3$ and $ZrO_2$ ($Al_2O_3+ZrO_2$): is at most 12%, and $Li_2O$, $Na_2O$ and $K_2O$ ($R_2O$): is at most 12%, and which glass has a glass transition temperature of at least 660° C.

2. The glass for a data storage medium substrate according to claim 1, wherein $SiO_2$ is at least 60 mol %, MgO is at least 2 mol %, BaO is from 0 to 5 mol %, $TiO_2$ is from 0 to 1 mol %, $ZrO_2$ is from 1 to 3.7 mol %, $Na_2O$ is at least 2 mol %, $La_2O_3$ is at most 3 mol %, and MgO, CaO, SrO and BaO (MgO+CaO+SrO+BaO) is at least 10 mol %.

3. The glass for a data storage medium substrate according to claim 2, wherein the mol ratio of $Li_2O$ and $Na_2O$ to the $K_2O$ content (($Li_2O+Na_2O$)/$K_2O$): is at most 3.0.

4. The glass for a data storage medium substrate according to claim 2, wherein a value obtained by dividing a product of the sum of MgO and CaO contents multiplied by the sum of $La_2O_3$ and $TiO_2$ contents, by $ZrO_2$ content ((MgO+CaO)×($La_2O_3+TiO_2$)÷$ZrO_2$): is at most 12.0 mol %.

5. The glass for a data storage medium substrate according to claim 2, wherein the ratio of $SiO_2$ content as represented by mass percentage to the sum of $TiO_2$ and $ZrO_2$ contents ($SiO_2$/($TiO_2+ZrO_2$)), is more than 10.0.

6. The glass for a data storage medium substrate according to claim 2, which contains no $TiO_2$.

7. The glass for a data storage medium substrate according to claim 1, wherein $R_2O$ is at least 5 mol %.

8. The glass for a data storage medium substrate according to claim 1, which contains no $B_2O_3$.

9. The glass for a data storage medium substrate according to claim 1, which has a glass transition temperature of at least 680° C.

10. The glass for a data storage medium substrate according to claim 1, which has an average linear expansion coefficient of at least $75×10^{-7}$/° C. within a range of from 50 to 350° C.

11. The glass for a data storage medium substrate according to claim 1, of which temperature at which the viscosity becomes $10^4$ dPa·s is at least a liquidus temperature.

12. The glass for a data storage medium substrate according to claim 1, comprising from 61 to 70% of $SiO_2$.

13. The glass for a data storage medium substrate according to claim 1, which has a density of at most 2.8 g/cm$^3$.

* * * * *